United States Patent
Rosen et al.

(10) Patent No.: US 8,287,004 B2
(45) Date of Patent: Oct. 16, 2012

(54) REUSABLE WINDOWED ENVELOPE

(75) Inventors: Alan Rosen, Shelton, CT (US); Allison Dahl, Brighton, MA (US); Douglas B. Quine, Bethel, CT (US); Jay Reichelsheimer, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 292 days.

(21) Appl. No.: 12/512,291

(22) Filed: Jul. 30, 2009

(65) Prior Publication Data

US 2011/0024488 A1 Feb. 3, 2011

(51) Int. Cl.
*B42D 15/00* (2006.01)

(52) U.S. Cl. ........................ 283/116; 283/901

(58) Field of Classification Search ............. 283/116, 283/901; 229/301, 303, 306; 209/584, 900
See application file for complete search history.

(56) References Cited

U.S. PATENT DOCUMENTS

| | | | |
|---|---|---|---|
| 5,029,901 A * | 7/1991 | Dotson et al. | 462/55 |
| 6,209,779 B1 * | 4/2001 | Fabel | 229/92.3 |
| 6,231,082 B1 * | 5/2001 | Van Boom et al. | 283/100 |
| 6,343,736 B1 * | 2/2002 | Kim | 229/303 |
| 6,481,753 B2 * | 11/2002 | Van Boom et al. | 283/72 |
| 6,523,859 B2 * | 2/2003 | Scheggetman et al. | 283/70 |
| 7,467,747 B2 * | 12/2008 | Haas et al. | 235/491 |
| 7,922,208 B2 * | 4/2011 | Haas et al. | 283/5 |
| 2005/0252955 A1 * | 11/2005 | Sugai et al. | 229/92.3 |
| 2010/0187293 A1 * | 7/2010 | Mehta et al. | 229/92.8 |

* cited by examiner

*Primary Examiner* — Dana Ross
*Assistant Examiner* — Kyle Grabowski
(74) *Attorney, Agent, or Firm* — Brian A. Collins; Charles R. Malandra, Jr.; Steven J. Shapiro

(57) ABSTRACT

A reusable mailing envelope includes a plurality of panels which, in combination, define a pocket for receipt of internal content material. One of the panels includes a window adapted to receive printed information to facilitate routing of the mailing envelope during the initial mail delivery. The reusable envelope also includes a means for preventing the readability of the printed information on the window during a subsequent mail delivery such that the routing instructions associated with the initial mail delivery are not interpreted and executed by the automated scanning equipment during the subsequent mail delivery.

9 Claims, 7 Drawing Sheets

REUSABLE WINDOWED ENVELOPE

TECHNICAL FIELD

The present invention relates to mailpiece envelopes, and, more particularly, to a new and useful mailpiece envelope adapted for reuse by masking print marks made by automated mailpiece handling equipment.

BACKGROUND OF THE INVENTION

In the spirit of reducing the environmental impact associated with fabricating mailpiece envelopes, i.e., the number of trees cut, transported and consumed, interest is increasing for mailpiece envelopes which can be used more than once. For example, in a typical billing process, a first envelope containing a bill/request for payment, is mailed to a recipient and, a second envelope, contained and delivered within the first, is used by the recipient to return payment. Hence, two (2) envelopes are consumed in a typical billing process. Inasmuch as this type of mail communication is perhaps the most common form of exchange, an envelope which can be used multiple times, offers a unique opportunity to lower the cost of mailing and save natural resources.

Various attempts have been made to introduce a single envelope which may be reconfigured for reuse by the mail recipient. That is, envelopes have been designed which, after initial mailing, may be used again for return correspondence. In this specific instance, a single reusable envelope substitutes for two (2) or more envelopes, such as those required for bill/payment mail communications, discussed in the preceding paragraph.

While the motivation to implement reusable envelopes is well-understood and appreciated, especially in view of the current environmental climate, difficulties associated with (i) alterations during delivery, (ii) damage to the envelope, (iii) ease of use, and/or (iv) high fabrication cost, have slowed the widespread acceptance of such envelopes. For example, when a mailpiece is delivered, automated handling equipment used by the United States Postal Service (USPS), scans the mailpiece to read a "pre-sort" or "preprinted"barcode", i.e., a barcode indicative of the recipient's destination address and which is used for sorting batches of mail into route/delivery order sequence. Should the pre-sort barcode be absent from the mailpiece, a scanner reads the destination address (i.e., via Optical Character Recognition (OCR) program code) and a barcode representative of the destination address is printed on the face of the mailpiece. This barcode information, also referred to as a POSTNET barcode, is now used by the automated handling equipment, e.g., distribution center sorters, to perform the requisite sorting (i.e., ZIP code or route order). Furthermore, the USPS uses these barcodes or Intelligent Mail Barcodes (IMBs) to encode the destination address.

While the printed barcode facilitates subsequent handling of a typical mailpiece i.e., one intended for one-way mail communications, the alterations produced by printing a barcode on the face of the envelope can create confusion during a subsequent mail delivery, i.e., mailpieces intended for reuse. For example, destination information printed during the preceding delivery, i.e., the barcode printed by the USPS, can, during a subsequent mail delivery, result in a "returned" mailpiece. That is, if the scanner interprets the previously printed barcode as the current destination address, the mailpiece will be delivered/returned to the sender's address rather than to the actual destination address.

While the printed barcode can be readily removed by erasure, or obscured by a label, each of these methods requires a positive action by the sender to reuse an envelope. That is, these methods require that directions posted on the reusable envelope, .e.g., "remove attached label and cover any information/barcode printed in lower right corner", be read by the sender and that and that the directions be followed correctly. Inasmuch as such directions can be inadvertently overlooked or incorrectly followed, it is disadvantageous for reusable envelopes to require actions other than those typically associated with mailing envelopes, e.g., open flap, insert content material so that the address can be seen though a transparent window, seal, apply postage, etc. Hence, reusable envelopes which are easy to use, i.e., do not require any unusual actions, will be most successful.

Other difficulties associated with reusable envelopes relate to the cost of fabrication and, more particularly, to the cost of invested capitol associated with new tooling or automated fabrication equipment. With respect to the latter, envelope manufacturers are, oftentimes, reluctant to invest in new equipment capable of handling the relatively complex flat patterns associated with reusable envelopes. That is, unless the flat patterns closely approximate those required for conventional mailpiece envelopes, a large investment may be required to fabricate unique, one-of-a-kind, tooling for processing more complex patterns. Inasmuch as these incremental additional costs cannot be easily amortized, the cost of the conventional two (2) envelopes can be less and more profitable than the cost of a single reusable envelope.

A need, therefore, exists for a reusable envelope which is facilitates ease of use, minimizes the cost of fabrication, and eliminates the potential for subsequent mail delivery errors due to information printed initial mail delivery.

SUMMARY OF THE INVENTION

A reusable mailing envelope includes a plurality of panels which, in combination, define a pocket for receipt of internal content material. One of the panels includes a window adapted to receive information printed which may be interpreted by automated scanning equipment to facilitate routing of the mailing envelope during the initial mail delivery. The reusable envelope also includes a means for preventing the readability of the printed information on the window during a subsequent mail delivery such that the routing instructions associated with the initial mail delivery are not interpreted and executed by the automated scanning equipment during the subsequent mail delivery.

BRIEF DESCRIPTION OF THE DRAWINGS

The accompanying drawings illustrate various embodiments of the invention, and assist in explaining the principles of the invention.

FIG. 1b depicts a front view of the same two-dimensional flat pattern of the reusable envelope shown in FIG. 1a.

DETAILED DESCRIPTION OF AN
EMBODIMENT OF THE INVENTION

The invention is directed to a reusable mailpiece envelope and a method for fabricating the same. While the reusable mailpiece envelope is described in the context of a conventional number ten (10) mailpiece envelope, it will be appreciated that the teachings herein are equally applicable to other style envelopes, e.g., executive style, flats type etc., including other types of reusable envelopes.

Figure 1A:
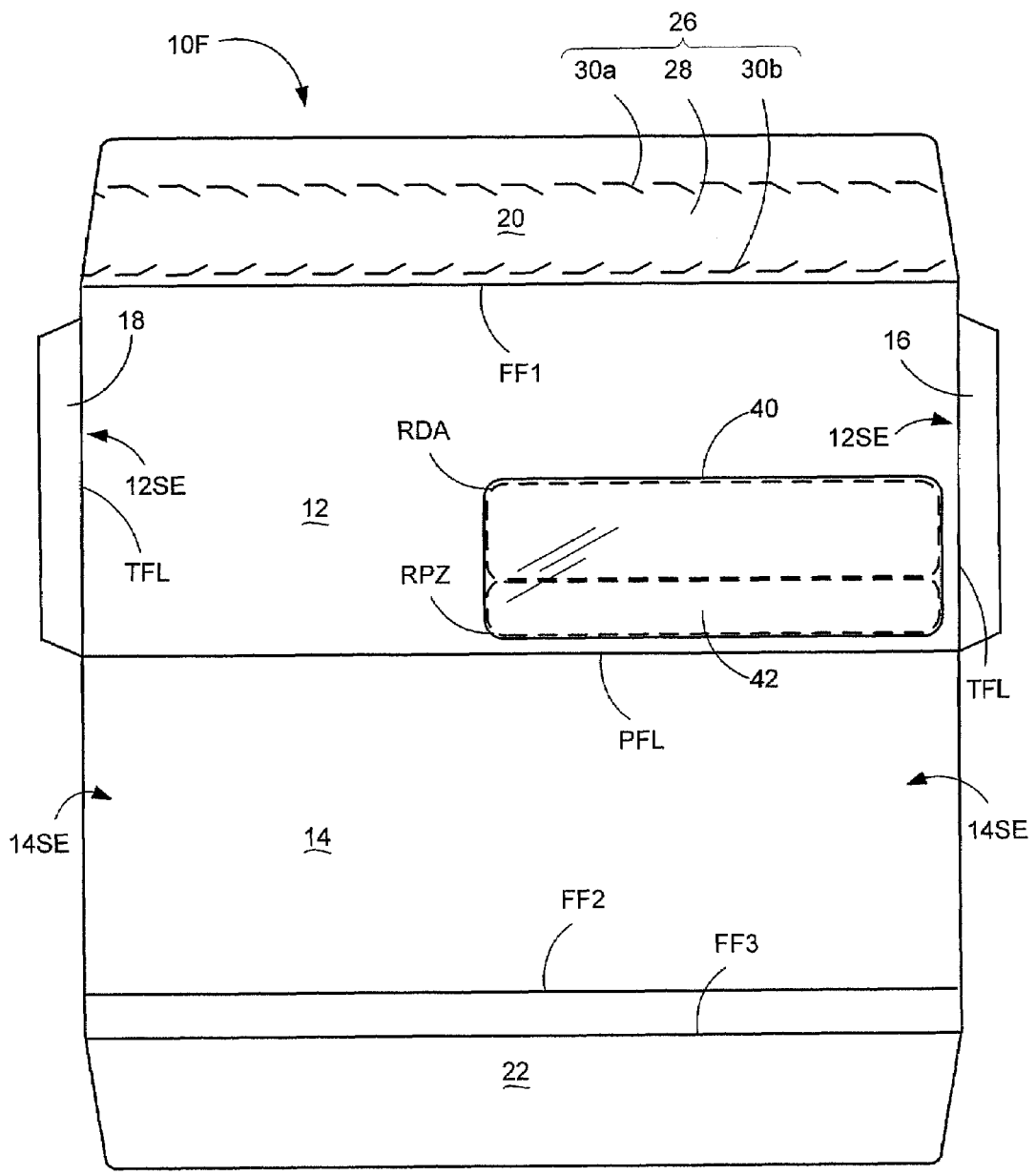
FIG. 1a depicts a back view of a two-dimensional flat pattern of the reusable envelope according to the present invention.
Figure 1B:
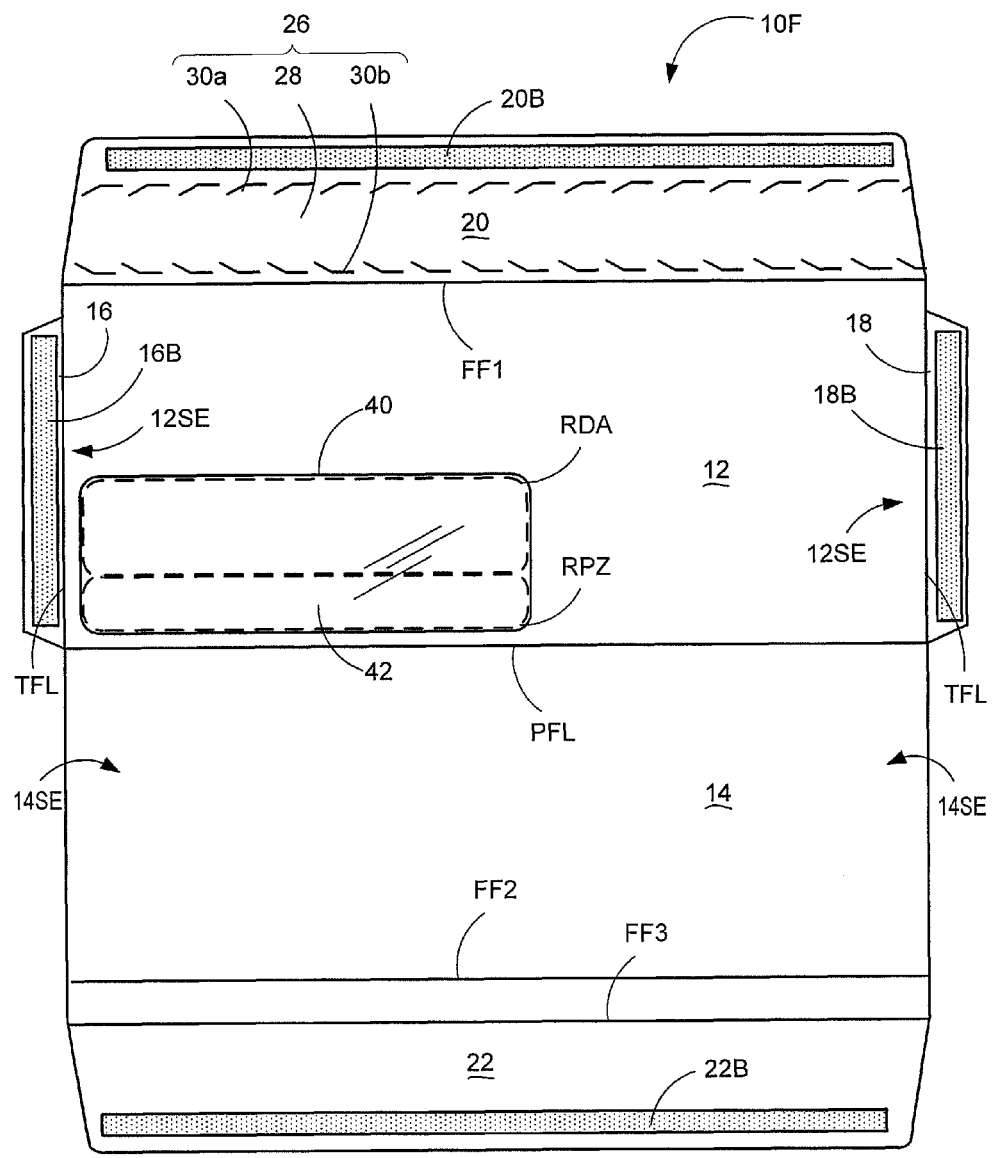

FIGS. 1a and 1b depict front and rear views, respectively, of a two-dimensional, flat pattern 10F of a reusable envelope 10 (shown folded and assembled in subsequent figures) according to teachings of the present invention. The flat pattern 10F includes front and back panels 12, 14, which are connected or attached along a panel fold PFL (i.e., the bottom edge of the reusable envelope when folded and assembled). Tabs 16, 18 project laterally from the side edges 12SE of the front panel 12 and seal, along bond lines 16B, 18B, to the side edges 14SE of the back panel 14. The bond lines 16B, 18B may be a pressure actuated bonding adhesive or a more conventional fluid-activated adhesive. In the described embodiment, each of the tabs 16, 18 connect to the front panel 12 along tab folds TFL, which facilitate folding of the tabs 16, 18 over the back panel 14, i.e., once the back panel 14 is folded and in register with the front panel 12. Alternatively, bond lines (not shown) may be disposed along the side edges 14SE of the back panel 14 and the tabs 16, 18 may be folded inwardly, before the back panel 14 is folded in register with the front panel 12.

Sealing flaps 20, 22 are connected to each of the front and back panels 12, 14 along flap folds FF1, FF2, FF3. More specifically, a first, or front sealing, flap 20 attaches to the front panel 12 along a first flap fold FF1 and includes a bond line 20B and a tear line 26. The bond line 20B comprises a conventional fluid activated adhesive and functions to seal the front flap 20 to the back panel 14 when wetted. The tear line 26 interposes the bond line 20B and the first flap fold FF1, but is preferably closer to the first flap fold FF1 to facilitate reconfiguration of the envelope for reuse. In the described embodiment, the tear line 26 is produced by a strip 28 which may be separated from the sealing flap 20 by lines of perforation 30a, 30b which are spaced-apart and substantially parallel. Functionally, the tear strip 28 opens the reusable envelope for (i) removal of the content material shipped in an initial mail delivery and (ii) and insertion of new content material shipped in a subsequent mail delivery.

A second, or back sealing flap, 22 attaches to the back panel 12 along a second flap fold FF2 and includes a bond line 22B and a third flap fold FF3. The bond line 22B comprises a conventional fluid activated adhesive and seals the second flap 22 to the front panel 12. It should be appreciated that the bond line 20B seals the front flap 20 to enclose the content material during the initial mail delivery while the bond line 22B seals the back flap 22 to enclose the content material during the subsequent mail delivery. Functionally, the second flap fold FF2 allows the second sealing flap 22 to be folded inwardly and stowed into the pocket of the envelope during the initial mail delivery. When using the panel fold PFL as a point of reference, the second flap fold line FF2 is closer to the panel fold PFL than the first flap fold FF1, i.e., the second flap fold FF2 is lower than the first flap fold FF1, to facilitate folding of the first sealing flap 20 over the second sealing flap 22.

The third flap fold FF3 is located between the bond line 22B and the second flap fold FF2, is spaced-apart from the second flap fold FF2 and is parallel thereto. Functionally, the third flap fold FF3 is farther from the panel fold line PFL than the first flap fold line FF1 to allow the second sealing flap 22 to fold over the first flap fold FF1 (after the first sealing flap 20 has been torn away following the initial mail delivery). This spatial relationship i.e., wherein the third flap fold FF3 is higher than the first flap fold FF1, facilitates folding of the second sealing flap 22 over the first flap fold FF1, or the remainder of the first sealing flap 20.

The front panel 12 includes at least one window 40 which bounds at least one region RPZ corresponding to a zone for printing information, i.e., information printed by the delivery agent to facilitate routing of the mailing envelope. Generally, the printed information relates to routing instructions, including the destination address of the reusable envelope (e.g., such as a POSTNET barcode), to facilitate delivery and/or routing thereof during the initial mail delivery. In the described embodiment, however, the window 40 comprises a first region RDA for displaying the destination address of the envelope and a second region RPZ corresponding to the zone for receiving the printed information. As illustrated, the first and second regions RDA, RPZ of the window 40 combine to define an enlarged rectangular shape, i.e., corresponding to the lower right hand corner of the envelope when folded and assembled. While the described embodiment depicts a convenient rectangular shape, the window 40 may have a variety of shapes for bounding the destination address and the region/zone for printing supplemental information.

In the described embodiment, the window 40 is covered by a substantially transparent film 42 which permits viewing of the internal content material and is adapted to receive printed information, e.g., printed barcode information. With respect to the latter, conventional transparent film for covering a windowed envelope is not adapted to receive ink inasmuch as the surface finish and lack of porosity prevent the deposited ink from combining with the film 42 and/or drying within a reasonably short duration, i.e., the deposited ink must dry within a sufficiently short time to allow continued routing/processing of the mailpiece without smearing/running of ink. Inasmuch as the window 40 may be adapted to perform two functions, i.e., transparency to view the destination address and the retention/readability of printed ink, the transparent film 42 is formulated to receive/evaporate deposited ink while remaining transparent for internal viewing. Further, since only a portion of the transparent film 42 is expected to receive print/ink, it may be desirable to treat or coat only that region RPZ where printed information is anticipated.

In the described embodiment, the transparent film 42 includes a material coating from the group of hydrophilic long-chain polymers which provides a surface receptive to inkjet print. In the context used herein, "receptive" means that the film 42 accepts deposited ink by adhering to, or combining with, the coating and/or drying of the ink within a threshold period of time/duration to resist smearing/running of the ink. An exemplary coating which may be employed is C-127-3 produced by Ontario Specialty Coatings Corporation of Watertown, N.Y. The coating may be applied using a KCC101 Coater with Mayer Rod #2 which deposits a film thickness of twelve (12) micrometers. After a first coat, the envelope is dried at 60 degrees and a second twelve (12) micrometer layer is applied.

Figure 2:
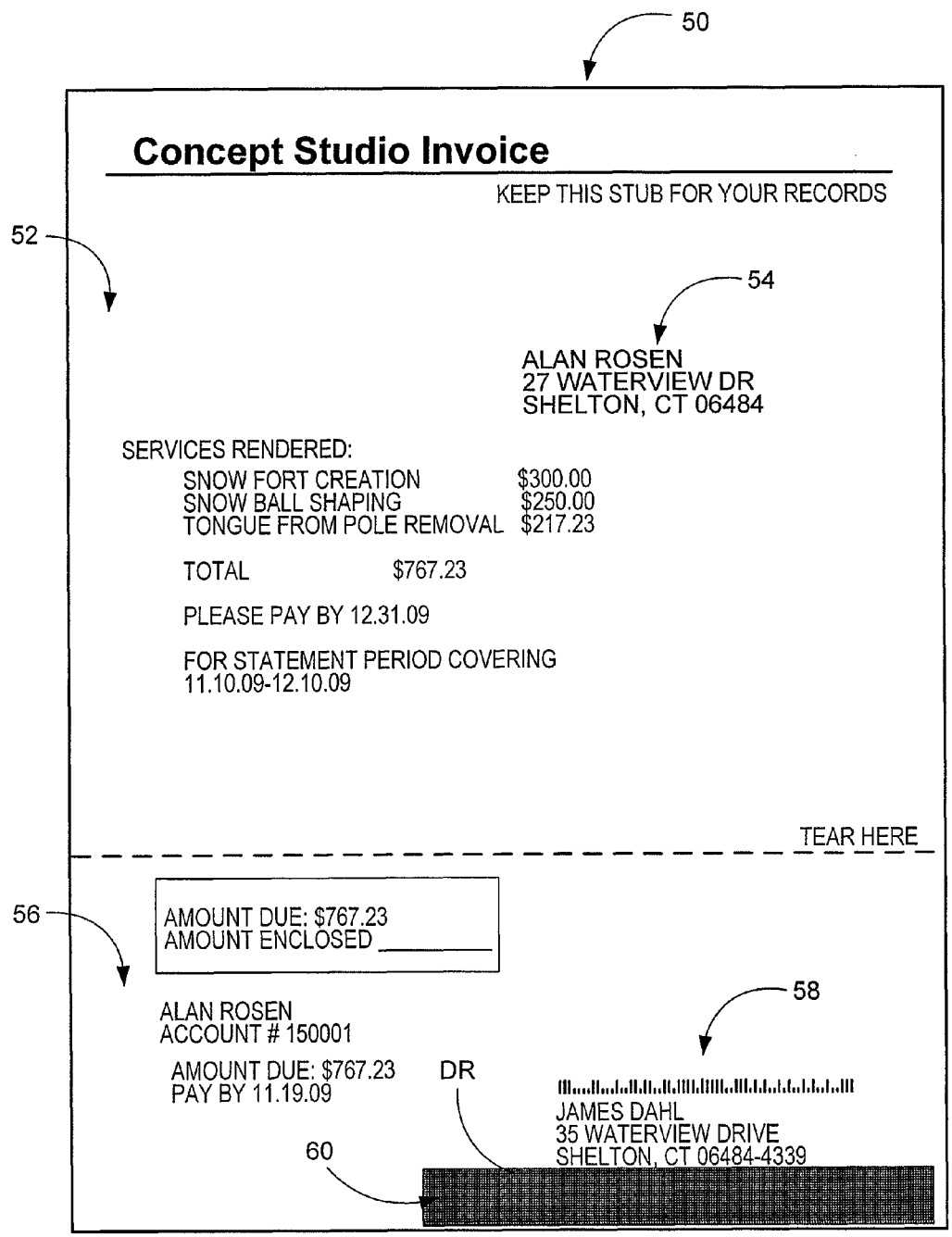
FIG. 2 depicts a sheet of content material used in combination with the reusable envelope including an upper portion containing the destination address of the initial mail recipient, and a lower portion containing the destination address of the subsequent mail recipient.

FIG. 2 depicts an exemplary sheet of content material 50 used in combination with the reusable envelope 10 of the present invention. Similar to a conventional billing/payment statement, the content material 50 comprises two portions: (i) an upper portion 52 containing the destination address 54 of a first mail recipient, i.e., associated with an initial mail delivery, and (ii) a lower, or stub, portion 56, containing the destination address 58 of a second mail recipient, i.e., associated with a subsequent mail delivery, and a means 60, viewable through the second region RPZ of the window, which prevents the readability of the printed information. In the broadest sense of the invention, the means 60 for preventing the readability of the printed information includes any device, treatment of the panels 12, 14, or content material 50 (e.g., the internal stub portion 56) which: (i) is disposed internally of the envelope and (ii) is viewable through region RPZ of the window and (iii) prevents the printed information from being read and/or interpreted by a scanning device/information processor, e.g. an optical, magnetic, thermal scanning device/processor. The means 60 for preventing the readability of information will be discussed in greater detail hereinafter when discussing the assembly and reuse of the envelope.

Figure 3:
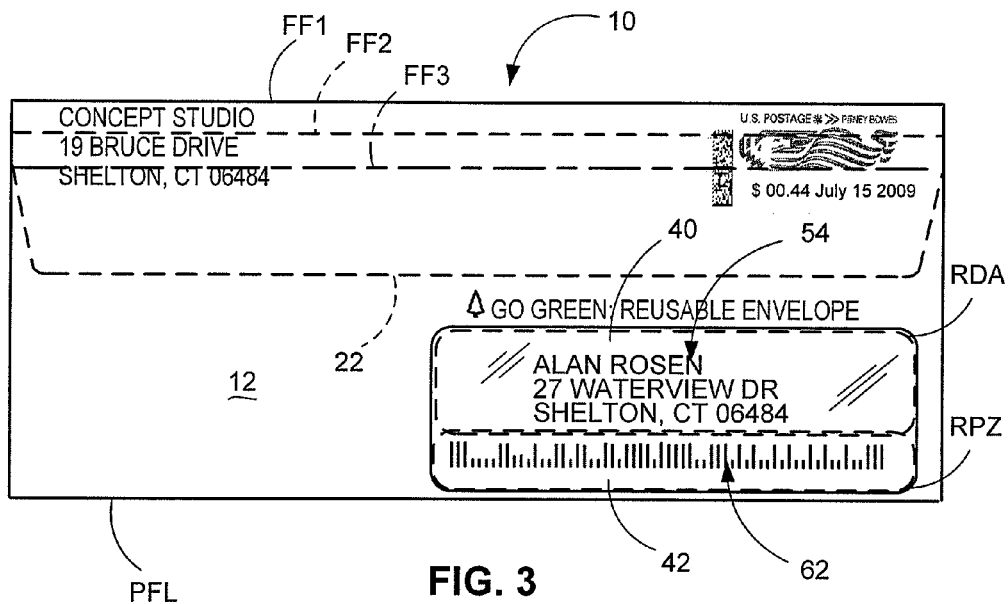
FIG. 3 is a front view of the reusable envelope according to the present invention following delivery to the initial mail recipient and wherein a barcode, indicative of the delivery address of the initial recipient, has been printed onto the window of the reusable envelope during the initial mail delivery.
Figure 4:
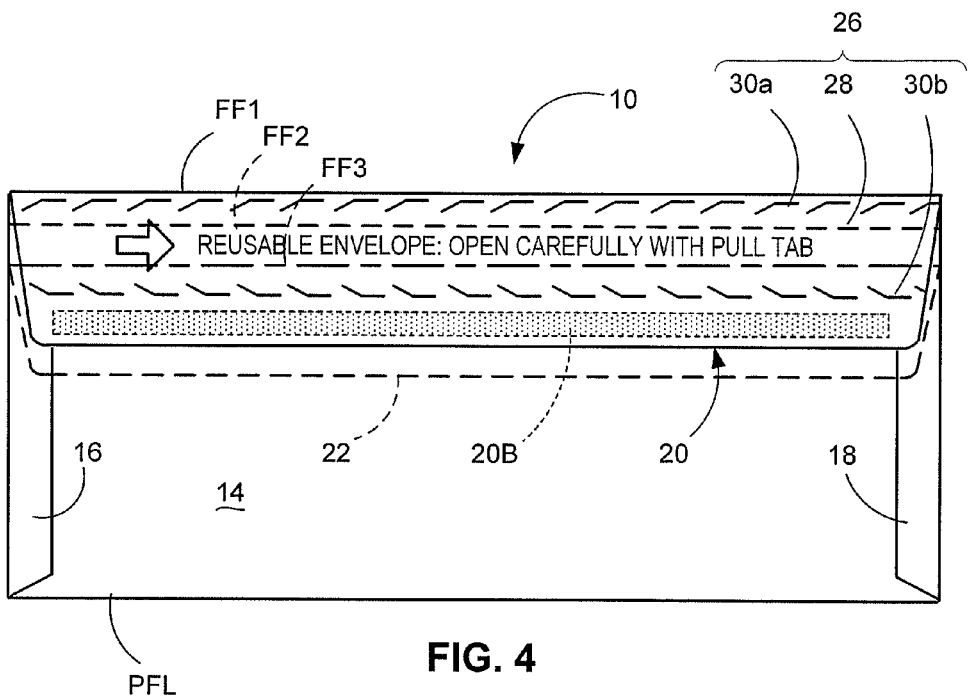
FIG. 4 is a back view of the reusable envelope shown in FIG. 3 including a tear strip for opening the reusable envelope.

In FIGS. 3 and 4 depict front and back views, respectively, of the reusable envelope 10 after being folded, assembled and mailed to the first mail recipient. In FIG. 3, the destination address 54 of the first mail recipient appears in the upper portion of the window 40, i.e., in region RDA, and a POSTNET barcode 62 has been printed by the delivery agent, e.g., the USPS, in the lower portion of the window 40, i.e., in region RPZ. As discussed in the Background of the Invention, whenever the delivery agent cannot find, or, for any one of a variety of reasons, fails to read a presort barcode (i.e., a barcode applied by the sender, which is the equivalent of a POSTNET barcode, to receive a presort postage discount), the delivery agent prints the POSTNET barcode 62 on the face of a mailpiece to facilitate subsequent handling/routing of the mailpiece during mail delivery. Inasmuch as the region RPZ has been coated with a layer of hydrophilic material, the transparent film 42 is receptive to the deposition of ink and accepts the printed barcode 62.

In FIG. 4, the front flap 20 is folded along the flap fold FF1 and sealed to the back panel 14 along bond line 20B. The back flap 22 (shown in phantom lines) is folded along flap fold FF2 and tucked between the front and back panels 12, 14. A message to "OPEN CAREFULLY WITH PULL TAB" is printed along the back side of the front flap 20, i.e., on the tear strip 28, to provide the recipient with instructions regarding reuse of the envelope.

Figure 5:
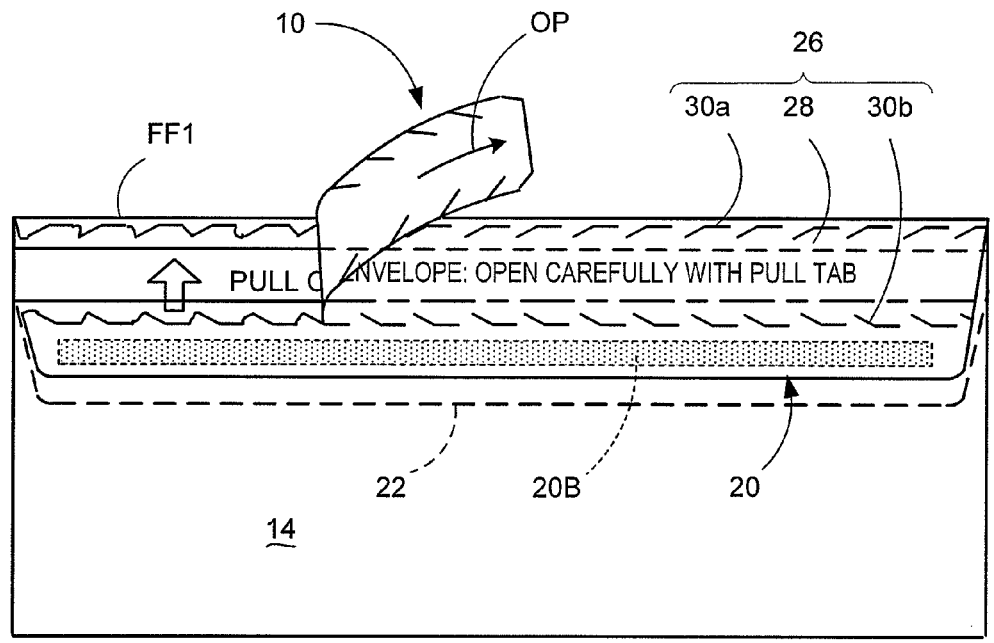
FIGS. 5 and 6 depict back views of the reusable envelope wherein the tear strip is removed from left to right to open the reusable envelope.
Figure 6:
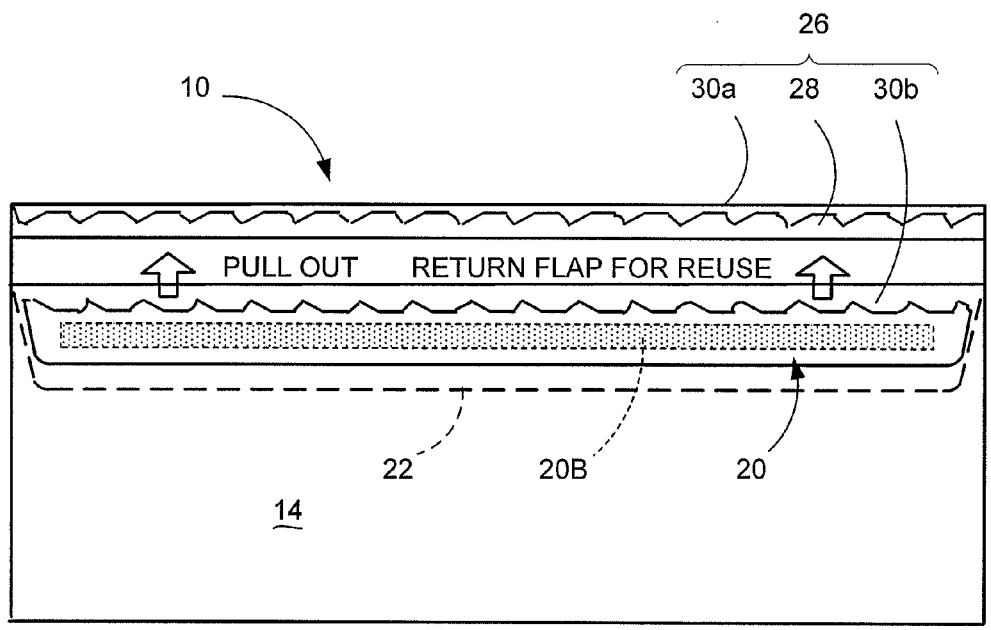

FIGS. 5 and 6 depict the tear strip 28 being pulled from left to right (i.e., in the direction of arrow OP) to open the envelope 10. The tear strip 28 separates the front flap 20 from the remainder of the envelope 10. As the mail recipient continues to tear away the strip 28 another message is revealed to "PULL OUT [the] RETURN FLAP" 22, i.e., an instruction which is performed when preparing the envelope 10 for subsequent delivery. Upon tearing the strip 28 away, the envelope 10 is open to remove the internal content material 50.

Figure 7:
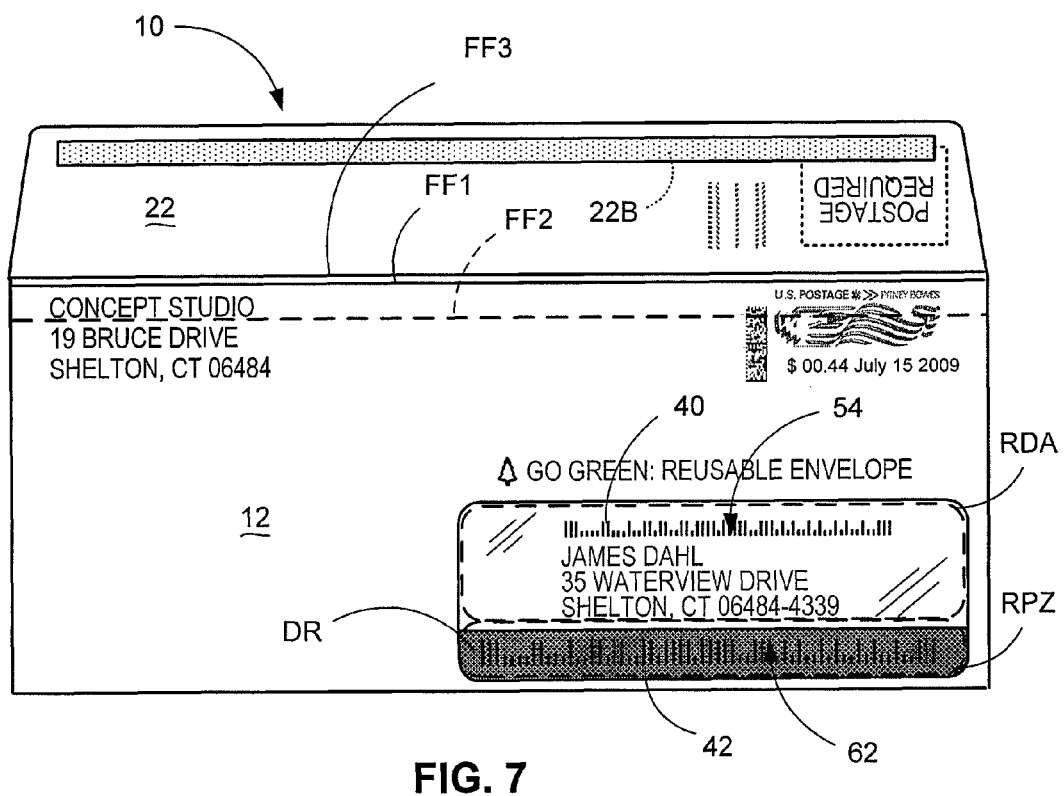
FIG. 7 depicts a front view of the reusable envelope wherein content material has been inserted into the pocket of the envelope and wherein the content material includes a means for preventing the readability of information printed during the initial mail delivery.

In FIGS. 2 and 7, the envelope 10 is assembled for reuse by (i) separating the stub portion 56 from the delivered content material 50, and (ii) inserting the same into the envelope 10 such that the means 60 for preventing the readability of printed information is disposed internally of the envelope 10 and juxtaposed the region RPZ of the window 40. In the described embodiment, the "means 60 for preventing the readability of printed information" comprises a region DR on the stub portion 56 which is treated to inhibit the ability of scanning equipment from interpreting differences in reflectivity across the region RPZ. In terms of the scanning equipment employed to read the printed information 62, the treated region DR reduces the difference in reflectivity across the region RPZ of the window, i.e., the printed information 62 combined with the treated background DR to a threshold level, i.e., a level which cannot be detected, deciphered or interpreted, by the scanning device/information processor.

Figure 8:
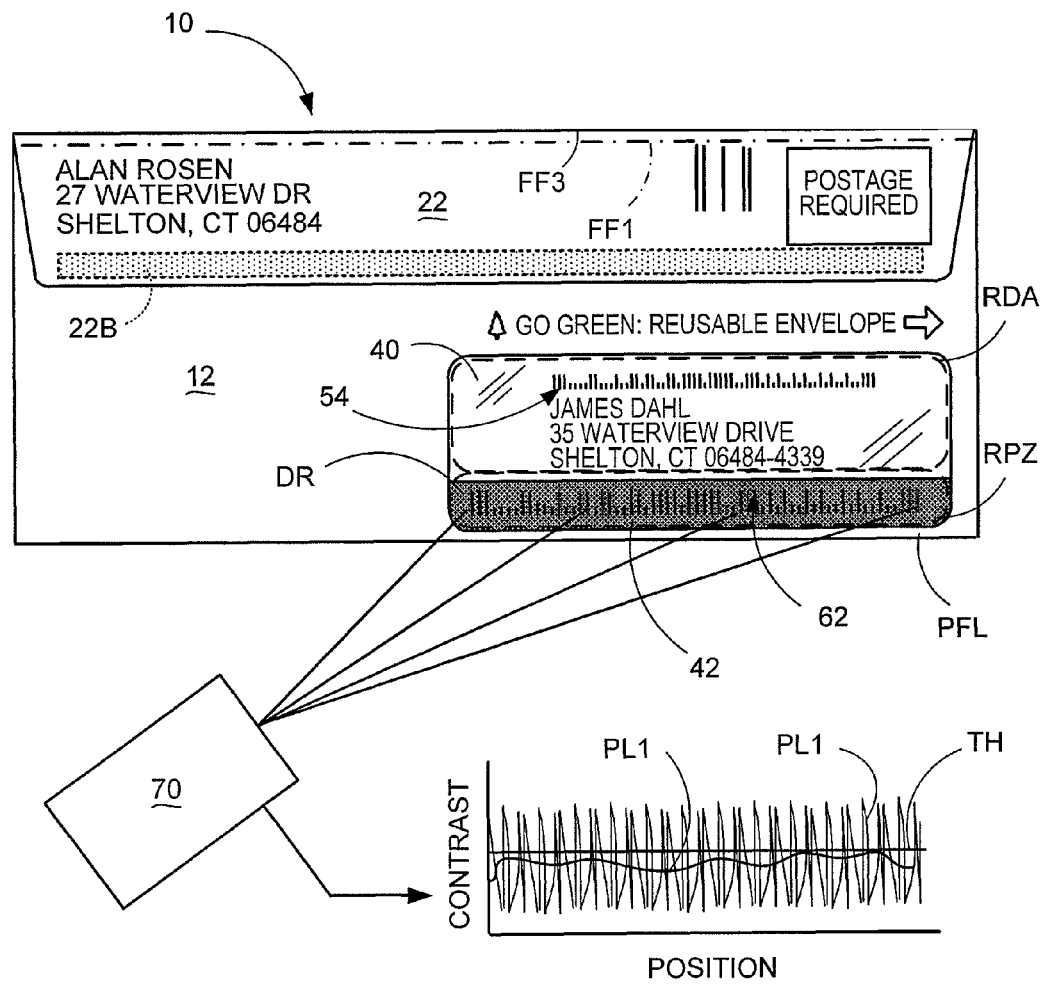
FIG. 8 depicts the front of the reusable envelope wherein a second flap is folded over the fold line of the first flap, sealed along a bond line to the front panel of envelope, and covers the previous return address/cancelled postage indicia.

In FIG. 8, the rear flap 22 folds along flap fold FF3, over flap fold FF1, and attaches to the front panel 12 along bond line 22B. When inserted into the envelope 10, the treated region DR of the stub portion 56 is viewable through the region RPZ of the window 40. In the illustrated embodiment, the treated region DR is a strip of dark ink which reduces the level of contrast between the printed information, e.g., each bar of the code 62, and the adjacent background which is viewable through the transparent film 42. FIG. 8 also shows contrast plots PL1 and PL2 and how a scanning device/information processor 70 may interpret or view the contrast/reflectivity. Plot PL1 schematically depicts a conventional signature of reflected energy as a result of scanning a printed barcode without altering the background, i.e., a conventional high contrast background. Plot PL2 schematically depicts the reflected energy sensed when scanning the printed barcode in combination with the treated region DR. With respect to plot PL2, it will be apparent that when the signature remains below a threshold value TH (i.e., a threshold level for interpreting the data), the scanning device/information processor 70 is unable to interpret the data.

It is to be understood that all of the present figures, and the accompanying narrative discussions of preferred embodiments, do not purport to be completely rigorous treatments of the articles and methods under consideration. For example, while, in the described embodiment, the treated region DR is disposed in combination with the content material 50, it should be appreciated that the treated region may be disposed in combination with other panels or elements of the reusable envelope 10. That is, an internal surface of the rear panel 14 may be treated with an absorptive coating, e.g., a coat or strip of dark ink, while the content material 50 may include a cut-out, opening or window which permits viewing of the treated internal surface. Alternatively, the pocket of the envelope 10 may be configured to prevent the content material 50 from covering or obscuring the treated surface of the rear panel 14 to permit viewing through the region RPZ of the window 40.

Consequently, a person skilled in the art will understand that the elements described represent general cause-and-effect relationships that do not exclude intermediate interactions of various types. A person skilled in the art will further understand that the various elements described in this application can be implemented by a variety of different combinations which need not be further elaborated herein.

What is claimed is:

1. A mailpiece for delivery by a delivery agent and adapted for reuse, the delivery agent employing a system for printing information on the mailpiece to facilitate delivery of the mailpiece, comprising:
    content material;
    a reusable envelope including a plurality of panels defining a pocket for receipt of the content material, one of the panels including at least one window having a region adapted to receive the printed information during the initial mailpiece delivery;
    a background strip viewable through the at least one region of the envelope to minimize a level of contrast relative to the printed information for preventing the readability of the printed information upon reuse of the mailpiece;
    a transparent film formulated to be receptive to inkjet print; and wherein the background strip is disposed on a portion of the content material so as to be viewable through the transparent film and comprises a color which reduces a level of contrast between the inkjet print disposed on the transparent film and the background strip.

2. The mailpiece according to claim 1 wherein the transparent film is a hydrophilic material.

3. The mailpiece according to claim 2 wherein the background strip is disposed on a portion of the content material so as to be viewable through the transparent film and comprises a color which reduces a level of contrast between the inkjet print disposed on the transparent film and the background strip.

4. The mailing envelope according to claim 3 wherein the window defines a first region for viewing a destination address printed on the content material and a second region adapted to receive the printed information.

5. The mailpiece according to claim 2 wherein the background strip is disposed on one of the panels of the envelope and internally of the pocket, the background strip being viewable through the transparent film and comprises a color which reduces a level of contrast between the inkjet print disposed on the transparent film and the background strip.

6. The mailing envelope according to claim 5 wherein the window defines a first region for viewing a destination address printed on the content material and a second region adapted to receive the printed information.

7. The mailpiece according to claim 1 wherein the background strip is disposed on one of the panels of the envelope and internally of the pocket, the background strip being viewable through the transparent film and comprises a color which reduces a level of contrast between the inkjet print disposed on the transparent film and the background strip.

8. The mailing envelope according to claim 7 wherein the window defines a first region for viewing a destination address printed on the content material and a second region adapted to receive the printed information.

9. The mailing envelope according to claim 1 wherein the window defines a first region for viewing a destination address printed on the content material and a second region adapted to receive the printed information.

* * * * *